United States Patent [19]

Ushimaru et al.

[11] Patent Number: 5,165,999
[45] Date of Patent: Nov. 24, 1992

[54] MAGNETIC RECORDING MEDIUM CONTAINING A POLYURETHANE RESIN HAVING A MODIFIED AMINE ACID INCORPORATED INTO THE RESIN

[75] Inventors: Akira Ushimaru; Hiroshi Hashimoto, both of Kanagawa, Japan

[73] Assignee: Fuji Photo Film Co., Ltd., Kanagawa, Japan

[21] Appl. No.: 524,522

[22] Filed: May 17, 1990

[30] Foreign Application Priority Data

May 17, 1989 [JP] Japan ................................. 1-123385

[51] Int. Cl.$^5$ .............................................. G11B 5/00
[52] U.S. Cl. ............................... 428/425.9; 428/424.6; 428/522; 428/694
[58] Field of Search ............... 428/900, 694, 423.1, 428/424.6, 425.9, 522; 528/65, 71

[56] References Cited

U.S. PATENT DOCUMENTS

| | | | |
|---|---|---|---|
| 4,136,079 | 1/1979 | Katayama et al. | 260/37 N |
| 4,404,253 | 9/1983 | Kohler et al. | 428/327 |
| 4,521,486 | 6/1985 | Ninomiya et al. | 428/407 |
| 4,559,397 | 12/1985 | Noll et al. | 528/45 |
| 4,571,364 | 2/1986 | Kasuga et al. | 428/336 |
| 4,637,959 | 1/1987 | Ninomiya et al. | 428/425.9 |
| 4,764,553 | 8/1988 | Mosbach et al. | 524/591 |

*Primary Examiner*—Paul J. Thibodeau
*Assistant Examiner*—Stevan A. Resan
*Attorney, Agent, or Firm*—Sughrue, Mion, Zinn, Macpeak & Seas

[57] ABSTRACT

A magnetic recording medium which comprises a nonmagnetic support having provided thereon a magnetic layer comprising ferromagnetic metal powder dispersed in a binder, wherein the binder contains a polyurethane resin having a

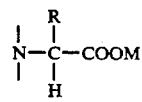

group introduced therein, wherein R represents a hydrogen atom or a straight or branched alkyl group having 1 to 4 carbon atoms and M represents a hydrogen atom, an alkali metal or $NH_4^\oplus$.

The magnetic recording medium has excellent electromagnetic converting characteristics and running durability.

17 Claims, No Drawings

MAGNETIC RECORDING MEDIUM CONTAINING A POLYURETHANE RESIN HAVING A MODIFIED AMINE ACID INCORPORATED INTO THE RESIN

FIELD OF THE INVENTION

This invention relates to a magnetic recording medium, more particularly to a magnetic recording medium improved in electromagnetic converting characteristics and running durability.

BACKGROUND OF THE INVENTION

In the prior art, as ferromagnetic powder of a magnetic recording medium, fine powder of $\gamma$-$Fe_2O_3$, $Fe_3O_4$, and these adsorbed or doped with cobalt ions, etc. have been used. In recent years, as the video tape, audio tape have been demanded to have higher performances, high signal density and high reproduction output in short wavelength recording are required, and to cope with this trend, ferromagnetic metal fine powder composed mainly of Fe, Fe-Co, or Fe-Co-Ni, have been used as ferromagnetic powder. However, such ferromagnetic metal powder has small crystallite size and yet very great magnetic moment, and therefore the above particles are liable to be agglomerated, with the result that it has become very difficult to disperse uniformly ferromagnetic metal fine powder into a binder.

For such problems, in order to enhance affinity of the binder for ferromagnetic powder, for example, binders containing caboxylic groups, sulfonic acid bases, etc. in the molecular structure have been proposed (JP-A-57-92422) (the term "JP-A" as used herein means an "unexamined published Japanese patent application"), but due to insufficient dispersibility of ferromagnetic metal fine powder, there have been involved the drawbacks that the surface characteristic of the magnetic coating was inferior, the residual magnetic flux density and the squareness ratio were unsatisfactory, and also powder drop-off is liable to occur resulting in inferior durability.

Accordingly, as a magnetic recording medium excellent in dispersibility of ferromagnetic powder, durability of magnetic layer and surface gloss, JP-A-59-40320 has proposed a combination of a vinyl chloride type binder and a polyurethane type binder having high dispersing function with hydrophilic groups introduced therein. This describes that the polyurethane type binder with hydrophilic polar groups introduced therein contributes to enhancement of the dispersibility of the ferromagnetic powder and the durability of the magnetic layer, while the vinyl chloride type binder with hydrophilic groups introduced therein contributes to enhancement of the dispersibility and the surface gloss of the ferromagnetic powder. Surely, by such combination, the improvement effects can be seen in these respects, but no improvement could be effected with respect to calender roll contamination, clogging, etc. JP-A-60-235814 proposes a binder obtained by copolymerization of vinyl chloride with a monomer having a strong acid group containing sulfur or phosphorus and a monomer having X-OH group (wherein X is an organic residue) in order to improve the characteristics of a vinyl chloride type copolymer. This improves dispersibility and gloss by having a strong acid group such as sulfonic acid, and also due to the presence through an organic group without direct bonding to the main chain as in vinyl alcohol, crosslinking reaction with isocyanate can be effected sufficiently, whereby durability, running performance are stated to be improved. However, even by use of such binder, calender roll contamination and clogging cannot be improved sufficiently.

Further, for effecting improvement of dispersibility of ferromagnetic metal fine powder and smoothening of the coating surface, there have been proposed the techniques of adding a surfactant, treating ferromagnetic powder with silicone oil, etc., adding a silane coupling agent having reactivity with the binder, etc., but none of these techniques has exhibited sufficient effect, and it has been demanded to have a binder exhibiting further excellent dispersibility for the ferromagnetic metal fine powder to be used for the magnetic recording medium for high density recording.

SUMMARY OF THE INVENTION

An object of the present invention is to provide a magnetic recording medium which can sufficiently disperse ferromagnetic metal fine powder, while using ferromagnetic metal fine powder, and yet which is improved in calender roll contamination, C/N (carrier/noise ratio), clogging, etc., having excellent electromagnetic converting characteristics and running durability, and is also excellent in compatibility with a recording head.

The present invention is a magnetic recording medium which comprises a non-magnetic support having provided thereon a magnetic layer comprising ferromagnetic metal powder dispersed in a binder, wherein said binder contains
a polyurethane resin having a

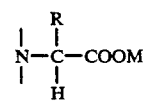

group introduced therein, wherein R represents a hydrogen atom or a straight or branched alkyl group having 1 to 4 carbon atoms and M represents a hydrogen atom, an alkali metal or $NH_4^\oplus$.

DETAILED DESCRIPTION OF THE INVENTION

Preferred embodiments of the present invention are as follows.

(1) A magnetic recording medium, wherein the glass transition temperature (Tg) of the above polyurethane resin having the

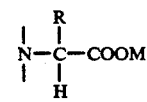

group introduced therein is $-40°$ to $30°$ C., and its number average molecular weight is 3,000 to 200,000.

(2) A magnetic recording medium, wherein the binder to be used in combination with the above polyurethane resin having the

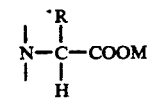

group introduced therein comprises (1) a vinyl chloride type resin containing (a) at least one polar group selected from the group consisting of —$SO_3M'$, —$SO_4M'$, —$OPO(OM')_2$, —$PO(OM')_2$, —$COOM'$, —$N(R')_2$, —$\oplus N(R')_3$ (in which M' is H, an alkali metal or $NH_4 \oplus$, and R' is H or a straight or branched alkyl group having 1 to 4 carbon atoms) and (b) —OH and (2) a polyisocyanate compound.

(3) A magnetic recording medium, wherein the above vinyl chloride type resin further contains an epoxy group.

In the polyurethane resin having a

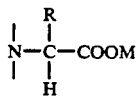

group, R is preferably a hydrogen atom or a methyl and M is preferably a hydrogen atom.

The group

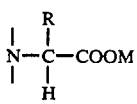

to be introduced into the urethane resin of the present invention has the basic point of N atom and the acidic point of $COO\ominus$, which are very firmly adsorbed to the acidic point and the basic point of ferromagnetic metal powder respectively, and consequently the metal powder can be improved in dispersibility.

When used together with the above-mentioned vinyl chloride type resin, dispersibility becomes extremely enhanced without lowering the amount adsorbed onto the ferromagnetic metal powder by competitive adsorption of vinyl chloride and polyurethane. Particularly, the shearing force in the kneading step becomes extremely great, whereby the kneading efficiency is high and dispersibility of the ferromagnetic metal powder can be further improved.

Also, in the aspect of durability, due to the greater amount of ferromagnetic metal powder adsorbed to the binder, not only mechanical strength of the magnetic layer is enhanced, but also such trouble as migration of unadsorbed binder to the magnetic layer surface to be attached or stuck onto the head of VTR (video tape recorder), etc. is remarkably decreased.

As an unexpected effect, mention may be made of the extremely small roll contamination in the calendering step by use of the above urethane resin. In the prior art, when the glass transition temperature (Tg) of the binder is lowered in order to enhance calendering moldability, the binder or the magnetic layer may be peeled off from the support or attached to the calendering roll, involving the problem that productivity is lowered. By use of the urethane resin of the present invention, even when Tg may be lowered in order to enhance calendering moldability, the problem of peel-off and calendering roll contamination is extremely small.

The polyurethane resin having the

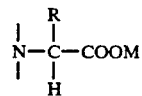

group of the present invention is a polyurethane resin (C) obtained from a polyol (A) comprising a polymeric polyol having a molecular weight of 400 to 4,000 ($A_1$), a low molecular weight polyol ($A_2$) and a modified amino acid represented by the following formula (I) ($A_3$) and an organic polyisocyanate (B):

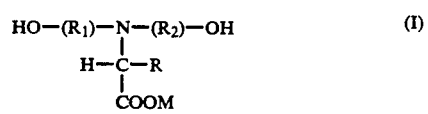

wherein $R_1$ and $R_2$ may be the same or different and each represents —$CH_2CH_2$—$(D)_m$—, or —$CH_2CH(CH_3)$—$(D)_n$— (in which m and n each represents an integer of from 2 to 10), and D represents —$OCH_2CH_2$—, —$OCH_2CH(CH_3)$— or a mixture thereof.

The modified amino acid represented by the formula (I) is an amino acid of the formula (I) wherein R is H or a straight or branched alkyl group having 1 to 4 carbon atoms (examples of the amino acid including glycine, alanine, valine, leucine, and isoleucine). Other than these, for example, neutral amino acids such as phenylalanine, serine, cysteine, etc., acidic amino acids such as aspartic acid, glutamic acid, etc., β-amino acid such as β-alanine, etc., γ-amino acid such as γ-aminobutyric acid, etc. can be also used.

In $R_1$, $R_2$ in the formula (I), m and n each is an integer of from 2 to 10. If m or n exceeds 10, the physical properties of the modified amino acid containing-urethane resin (C) will be lowered. On the other hand, when m or n is not 2 or more, solubility of the modified amino acid in the polymerization solvent is poor, whereby it cannot react with the organic polyisocyanate to give the desired urethane resin (C).

As the method for modifying amino acids, for example, there is the method of adding alkylene oxide to the —$NH_2$ group of the amino acid in the presence of NaOH. Also, when the amide group is already dihydroxylated as in dihydroxyethylglycine ($HOCH_2CH_2)_2NCH_2COOH$, it can be obtained by reacting alkylene oxide with an —OH group.

As the compound represented by the formula (I), there are, for example,

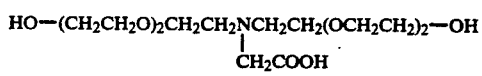

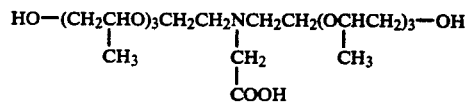

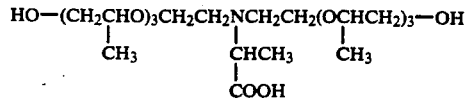

As the polymeric polyol ($A_1$) having a molecular weight of 400 to 4,000 in the present invention, polyether diols and polyester diols may be mentioned.

As the polyether diol, there may be included (1) alkylene oxide (alkylene oxide having 2 to 4 carbon atoms: e.g., ethylene oxide, propylene oxide, 1,2-, 2,3-, and 1,3-butylene oxide, etc.) adducts of low molecular weight diols [e.g., ethylene glycol, diethylene glycol, propylene glycol, dipropylene glycol, 1,4-, 1,3-butane diol, neopentyl glycol, 1,6-hexane diol, 1,8-octamethylene diol, 1,10-decane diol, alkyldialkanolamine; low molecular weight diols having cyclic group {e.g. glycols such as cyclohexane diol, cyclohexane dimethanol, etc. and those disclosed in JP-B-45-1477 (the term "JP-B" as used herein means an "examined Japanese patent publication"); bis(hydroxymethyl)cyclohexane, m- and p-xylene glycol, bis(hydroxyethylbenzene), 1,4-bis(2-hydroxyethoxy) -benzene, 4,4'-bis(2-hydroxyethoxy)-diphenylpropane (ethylene oxide adduct of bisphenol A) etc.}, and mixtures of two or more kinds of these] and (2) those obtained by ring opening copolymerization (block and/or random) of alkylene oxide cyclic ethers (tetrahydrofuran, etc.) [e.g., polyethylene glycol, polypropylene glycol, polyethylene-polypropylene (block and/or random) glycol, polytetramethylene ether glycol, polytetramethylene-ethylene (block and/or random) glycol, polytetramethylene-propylene (block and/or random) glycol, polyhexamethylene ether glycol, polyoctamethylene ether glycol and mixtures of two or more kinds of these].

As the polyester diol, there may be included the condensed polyester diols obtained by the reaction of the above-mentioned low molecular weight diol and/or the polyether diol having a molecular weight of 1,000 or lower with dicarboxylic acid, polylactone diol obtained by ring opening polymerization of lactone, etc. As the polyether diol having a molecular weight of 1,000 or lower, the above polyether diols, for example, polyethylene glycol, polytetramethylene ether glycol, polypropylene glycol, triethylene glycol, and mixtures of two or more kinds of these may be included. As dicarboxylic acid, aliphatic dicarboxylic acids (succinic acid, adipic acid, sebacic acid, glutaric acid, azelaic acid, maleic acid, fumaric acid, etc.), aromatic dicarboxylic acids (terephthalic acid, isophthalic acid, etc.) and mixtures of two or more kinds of these may be included. As lactone, ε-caprolactone, δ-valerolactone may be included.

Polyester diols can be prepared according to conventional methods, for example, by reacting low molecular weight diols and/or polyester diols having a molecular weight of 1,000 or lower with dicarboxylic acids or ester forming derivatives thereof [e.g. anhydrides (maleic anhydride, phthalic anhydride, etc.), lower esters (dimethyl terephthalate, etc.), halides, etc.], or anhydrides thereof and alkylene oxides (e.g. ethylene oxide and/or propylene oxide), or by adding a lactone to an initiator (lower molecular weight diol and/or polyether diol or polyester diol having a molecular weight of 1,000 or lower).

Specific examples of these polyester diols may include polyethylene adipate, polybutylene adipate, polyhexamethylene adipate, polyneopentyl adipate, polyethylene propylene adipate, polyethylene butylene adipate, polybutylene hexamethylene adipate, polydiethylene adipate, poly(polytetramethylene ether) adipate, polyethylene azelate, polyethylene sebacate, polybutylene azelate, polybutylene sebacate, polyethylene phthalate, polybutylene phthalate, polycaprolactone diol and mixtures of two or more kinds of these.

Also, polymer polyols, polycarbonate polyols and polybutadiene polyols, etc. can also be used. Among these, preferable are aromatic dicarboxylic acid type polyester diols, adipic acid type polyester diols, polycaprolactone diols, polycarbonate diols, etc. Polymeric polyol ($A_1$) may have a molecular weight of 400 to 4,000, preferably 500 to 3,000.

As the low molecular weight polyol ($A_2$) in the present invention, there may be included the low molecular weight diols mentioned above and trihydric to octahydric alcohols such as glycerine, trimethylolpropane, trimethylolethane, hexanetriol, pentaerythritol, diglycerine, α-methylglucoside, sorbitol, xylitol, mannitol, glucose, fructose, sucrose, etc.

Among them, preferable are alkylene glycols with 2 to 10 carbon atoms, trimethylolpropane, etc. Also, ester diols obtained by the reaction between the above-mentioned low molecular weight diols and monohydroxymonocarboxylic acids may be included. As monohydroxymonocarboxylic acid, there may be included glycolic acid, lactic acid, hydroxyacrylic acid, α-oxybutyric acid, oxypivalic acid, salicylic acid, m- or p-oxybenzoic acid and mixtures of two or more kinds of these. Among them, preferable are ester diols obtained by the reaction between glycols with 2 to 6 carbon atoms and oxypivalic acid.

As the organic polyisocyanate (B) in the present invention, aliphatic diisocyanates, alicyclic diisocyanates, aromatic diisocyanates and polyisocyanates may be mentioned.

As aliphatic diisocyanate, there may be mentioned ethylene diisocyanate, tetramethylene diisocyanate, hexamethylene diisocyanate (HMDI), dodecamethylene diisocyanate, 2,2,4-trimethylhexane diisocyante, lysine diisocyante, 2,6-diisocyanate methylcaproate, bis(2-isocyanatoethyl) fumarate, bis(2-isocyanatoethyl) carbonate, and the like.

As alicyclic diisocyanate, there may be included isophorone diisocyanate (IPDI), dicyclohexylmethane diisocyante (hydrogenated MDI), cyclohexylene diisocyanate, methylcyclohexylene diisocyanate (hydrogenated TDI), tetramethylxylylene diisocyanate (TMXDI), bis(2-isocyanatoethyl)-4-cyclohexene-1,2-dicarboxylate, and the like.

As aromatic diisocyanate, there may be included 1,3- and/or 1,4-phenylene diisocyante, 2,4- and/or 2,6-toylene diisocyanate (TDI), diphenylmethane-2,4,- and/or 4,4'-diisocyanate (MDI), naphthylene-1,5-diisocyanate, m- and/or p-isocyanate phenylsulfonyl isocyanate, and the like.

As polyisocyanate, there may be included a water-modified product of HMDI, trimer of IPDI, polytolylene diisocyanate (crude TDI), polyphenylmethane polyisocyanate (crude MDI), modified MDI (carbodiimide-modified MDI, etc.) and mixtures of two or more kinds of these.

Among them, preferable are aliphatic diisocyanates, alicylic diisocyanates and aromatic diisocyanates, particularly HMDI, IPDI and TDI.

The content of ($A_3$) in the polyols may be generally 0.1 to 30 equivalent %, preferably 0.1 to 20 equivalent % i.e., based on the total of $A_1+A_2+A_3$. If the content of ($A_3$) is less than 0.1 equivalent %, dispersibility of pigments and inorganic fillers is not sufficient, while if it exceeds 30 equivalent %, the viscosity of the magnetic coating material will be markedly increased to worsen coatability.

The content of (A$_2$) may be 5 to 90 equivalent %, preferably 10 to 80 equivalent %. If the content of (A$_2$) is less than 5 equivalent %, the film properties of the urethane resin formed are lowered to worsen durability. On the other hand, if the content of (A$_2$) exceeds 90 equivalent %, the film becomes rigid and adhesion to the substrate is lowered.

The content of (A$_1$) may be 10 to 90 equivalent %, preferably 15 to 65 equivalent %. With a content less than 10 equivalent %, solubility of the urethane resin formed is lowered to worsen coating material viscosity, dispersibility of pigments and inorganic fillers. If it exceeds 90 equivalent %, the film properties of the urethane resin are lowered to worsen durability.

The equivalent of polyol (A), which is determined by dividing the molecular weight of polyol by the number of hydroxyl groups contained therein is generally 100 to 1600.

If the equivalent of (A) is less than 100, the formed urethane resin becomes a brittle resin with poor film forming property, and is not sufficient as the binder for magnetic recording material. On the other hand, if the equivalent exceeds 1600, the film strength is lowered, and also friction resistance and scratch resistance are lowered.

In carrying out the reaction between (A) and (B), the equivalent ratio of (B) to (A) should be generally 0.6 to 1.5, preferably 0.8 to 1.2. If the equivalent ratio is less than 0.6 and over 1.5, the molecular weight of the polyurethane resin obtained by the reaction between (A) and (B) is lowered to lower dispersibility, and also friction resistance and adhesition of the coated film are liable to be lowered.

The above reaction can be carried out in the presence or absence of a solvent inert to isocyanate groups. As such solvent, there may be mentioned ester type solvents (ethyl acetate, butyl acetate, etc.), ether type solvents (dioxane, tetrahydrofuran, etc.), ketone type solvents (cyclohexanone, methyl ethyl ketone, methyl isobutyl ketone, etc.), aromatic hydrocarbon type solvents (toluene, xylene, etc.) and solvent mixtures of two or more kinds of these.

As the reaction method, there may be employed the method in which (A) and (B) are charged in a reactor at once to carry out the reaction, the method in which respective (A) and (B) are divided into two or more components to carry out the reaction in multi-stages and the method in which (A) and (B) previously mixed are passed through a heated continuous kneader to carry out the reaction.

The reaction temperature may be generally 40° to 130° C., preferably 40° to 100° C. In the reaction, for accelerating the reaction, catalysts used in conventional urethane reaction, such as tin type catalyst (trimethyltin laurate, trimethyltin hydroxide, dimethyltin dilaurate, dibutyltin dilaurate, stannous octoate, etc.), lead type catalyst (lead oleate, lead 2-ethylhexoate, etc.), etc. can also be used.

The polyurethane resin (C) has a number average molecular weight generally of 3,000 to 200,000, preferably of 5,000 to 150,000.

The molecular weight per one —COOH group may be generally 1,000 to 200,000, preferably 5,000 to 150,000. If the molecular weight per one —COOH group is less than 1,000, the coating material viscosity becomes higher and also dispersibility is lowered.

The polyurethane resin (C) obtained from the reaction of (A) and (B) should preferably have a glass transition temperature of the polyurethane resin used as the binder for coating material of −40° C. to +30° C. In excess of this range, calendering moldability is lowered to lower electromagnetic converting characteristic. At lower than this range, durability is lowered.

In the magnetic recording medium of the present invention, the content of the above-described polyurethane in the binder may be preferably 10 to 50% by weight, particularly 20 to 40% by weight, based on the total binder.

The vinyl chloride type resin to be used in combination with the binder of the present invention should preferably contain one or more selected from the group consisting of —SO$_3$M', —SO$_4$M', —OPO(OM')$_2$, —PO(OM')$_2$, —COOM', —N(R')$_2$, —⊕N(R')$_3$ and —OH group as the polar group (in which M' and R' are defined as above).

It is preferred that the vinyl chloride type resin further contains an epoxy group.

The vinyl chloride type resin of the present invention should be preferably one containing of a vinyl chloride type copolymer, a vinyl chloride-vinyl acetate type copolymer, a vinyl chloride-glycidyl (meth)acrylate type copolymer, a vinyl chloride-allyl glycidyl ether type copolymer, and a vinyl chloride-vinylidene chloride-vinyl acetate type copolymer as the base. The synthetic methods of these are described in, for example, JP-A-58-177524 and U.S. Pat. No. 4,851,465 (JP-A-60-235814).

A preferable amount of the above polar groups may be $1 \times 10^{-5}$ to $30 \times 10^{-5}$ eq/g, and preferable polar groups are —SO$_3$M' group, —OPO(OM')$_2$ group.

A preferable amount of the above —OH group may be $10 \times 10^{-5}$ to $200 \times 10^{-5}$ eq/g, and rather than —OH groups directly bonded to the main chain as in vinyl alcohol, —OH groups of, for example, polyethyleneoxide adducts, and polypropylene oxide adducts of (meth)acrylic acid are preferred.

If the polar group content is lower or higher than the range as specified above, dispersibility will be lowered. If the —OH content is lower than the range specified above, curability and durability will be lowered, while if it is higher, solvent solubility will be lowered.

The weight-average molecular weight of the above-mentioned vinyl chloride type resin should be preferably 20,000 to 100,000. If it is smaller than this range, durability is worsened, while dispersibility will be lowered if it is greater.

These vinyl chloride type resins should be preferably 30 to 60 parts by weight per 100 parts by weight of the total binder.

As the polyisocynate compound to be used in the present invention, compounds having 2 or more isocyanate groups may be employed. For example, there may be employed isocyanates such as toluylene diisocyante, 4,4'-diphenylmethane diisocyante, hexamethylene diisocyante, xylylene diisocyante, naphthylene-1,5-diisocyanate, o-toluidine diisocyanate, isophorone diisocyanate, triphenylmethane triisocyanate, etc., the reaction products of these isocyanates and polyalcohols, polyisocynates formed by condensation of these isocyanates, and so on. Examples of the above-mentioned polyisocyanates are commercially sold under the trade names such as Coronate L, Coronate HL, Coronate H, Coronate EH, Coronate 2030, Coronate 2031, Coronate 2036, Coronate 3015, Coronate 3041, Coronate 2014, Millionate MR and Millionate MTL, from Nippon Polyurethane Co., Ltd., Takenate D-102, Takenate D-110N, Takenate D-200 and Takenate D-202 from Takeda Chemical Industries, Ltd., Sumidur N75 from Sumitomo Bayer Co., Ltd., Desmodule L, Desmodule IL, Desmodule N and Desmodule HL from West Germany Bayer, and Burnock-D850 and Burnock-D802 from Dainippon Ink and Chemicals, Inc. These polyisocyanates should be preferably 5 to 40 parts by weight per 100 parts of the total binder including polyisocyanates.

In the present invention, ferromagnetic metal powder is used as the ferromagnetic powder. As such ferromagnetic metal powder, for example, there may be included alloys containing 75% by weight of more or a metal compound in the ferromagnetic metal powder, and with at least 80% by weight or more being at least one ferromagnetic metal or alloy (e.g. Fe, Co, Ni, Fe-Co, Fe-Ni, Co-Ni, Co-Ni-Fe), which may also contain other components within the range of 20% by weight or less of said metal component (e.g. Al, Si, S, Sc, Ti, V, Cr, Mo, Cu, Zn, Y, Mo, Rh, Pd, Ag, Sn, Sb, Te, Ba, Ta, W, Re, Au, Hg, Pb, Bi, La, Ce, Pr, Nd, B, P). Also, the above-mentioned metal may also contain small amounts of water, hydroxides or oxides thereof. The methods for producing these ferromagnetic metal powders have been known per se, and the ferromagnetic metal powder in the present invention may be produced according to such known methods.

The shape of the ferromagnetic metal powder in the present invention is not particularly limited, but generally, those in the shape of needles, granules, dices, rice granules and plates may be used.

The crystallite size of the ferromagnetic metal powder in the present invention may be preferably 250 Å or less, particularly 200 Å or less. Here, the crystallite size means the crystallite size determined by X-ray diffraction.

In preparing the magnetic layer of the magnetic recording medium of the present invention, the ferromagnetic metal powder and the binder, and known additives (materials) such as organic or inorganic fillers, carbon black, dispersing agent, antistatic agent, lubricant, abrasive, etc. are kneaded with a solvent to form a magnetic coating material.

The above filler is not particularly limited, but, for example, granular fillers conventionally used with an average particle size of 0.01 to 0.8 $\mu$m, preferably from 0.06 to 0.4 $\mu$m, can be used. Examples of the above-mentioned filler can include particles of graphite, tungsten disulfide, boron nitride, calcium carbonate, aluminum oxide, iron oxide, titanium dioxide, magnesium oxide, zinc oxide, calcium oxide, lithopone and talc, etc., and these can be used singly or in a mixture.

As carbon black, furnace black, thermal black, black for color, acetylene black, etc. can be used. As for the properties of carbon black, those having an average particle size of 5 to 1000 m$\mu$ (electron microscope), a nitrogen adsorption method specific area of 1 to 800 m$^2$/g, a pH of 4 to 11 (JIS K6221) and a dibutyl phthalate oil absorption amount of 10 to 800 ml/100g (JIS K6221) are preferred. Concerning the size of carbon black, for the purpose of lowering the surface electrical resistance of the coated film, carbon black of 5 to 100 m$\mu$, for the purpose of controlling the strength of the coated film, carbon black of 50 to 1,000 m$\mu$, and for the purpose of controlling the surface roughness of the coated film and for smoothening for reduction of spacing loss carbon black of finer size (100 m$\mu$ or less), and for the purpose of lowering frictional coefficient by roughening the surface, carbon black of coarse particles (50 m$\mu$ or more) may be employed. Carbon black of fine particles and carbon black of coarse particles may be also used in combination. Also, carbon black of which a part of the surface is graphitized or grafted can also be used.

Examples of the dispersing agent may include known dispersing agents such as fatty acids having 9 to 22 carbon atoms (e.g. caprylic acid, capric acid, lauric acid, myristic acid, palmitic acid, stearic acid, oleic acid, elaidic acid, linoleic acid, linolenic acid, stearolic acid), metal soaps comprising the above fatty acids and alkali metals (e.g. lithium, sodium, potassium) or alkaline earth metals (e.g. magnesium, calcium, barium), esters of the above fatty acids and compounds of which a part or all of hydrogens are substituted with fluorine atoms, amides of the above fatty acids, fatty acid amines, higher alcohols, polyalkyleneoxide alkylphosphoric acid esters, alkylphosphoric acid esters, alkylboric acid esters, sarcosinates, alkyl ether esters, trialkyl polyolefinoxy quaternary ammonium salts, lecithin, etc. When a dispersing agent is used, it may be used generally in an amount ranging from 0.05 to 20 parts by weight based on 100 parts by weight of the binder used.

As the dispersing agent, it is particularly preferable to use a saturated or unsaturated fatty acid having 12 to 32 carbon atoms such as lauric acid, myristic acid, palmitic acid, stearic acid, behenic acid, oleic acid, elaidic acid, linoleic acid, linolenic acid, stearolic acid, etc.

Examples of the antistatic agent may include electroconductive fine powder such as carbon black, carbon black graft polymer; natural surfactants such as saponin; nonionic surfactants such as alkyleneoxide type, glycerine type and glycidol type, etc.; cationic surfactants such as higher alkylamines, quaternary ammoium salts, salts of pyridine and other heterocyclic compounds, phosphonium or sulfonium, etc.; anionic surfactants containing acidic groups of carboxylic acid, sulfonic acid, phosphoric acid, sulfuric acid ester group, phosphoric ester group, etc.; amphoteric surfactants such as amino acids, aminosulfonic acids, sulfuric acid or phosphoric acid esters of amino alcohols, etc. When the above-mentioned electroconductive fine powder is used as the antistatic agent, it may be used in an amount of, for example 0.2 to 20 parts by weight based on 100 parts by weight of the ferromagnetic metal powder, while when a surfactant is used, it may be used in an amount of 0.1 to 10 parts by weight.

Examples of the lubricant may include the above-mentioned fatty acids and fatty acid amides thereof, higher alcohols, fatty acid esters comprising monobasic fatty acids having 12 to 20 carbon atoms and mono- or polyhydric alcohols having 3 to 20 carbon atoms such as butyl stearate, sorbitane oleate, etc., mineral oils, animal and vegetable oils, olefinic low molecular weight polymers, $\alpha$-olefinic low molecular weight polymers, and otherwise known lubricants such as silicone coil, graphite fine powder, molybdenum disulfide fine powder, Teflon fine powder, etc., lubricants for plastics, etc. The amount of the lubricant added can be freely determined according to known techniques.

Examples of abrasives may include $\alpha$-alumina, molten alumina, silicon carbide, chromium oxide, cerium oxide, corundum, artificial diamond, $\alpha$-iron oxide, garnet, emery (main component: corundum and magnetite), silica, silicon nitride, boron nitride, molybdenum carbide, boron carbide, tungsten carbide, titanium carbide, tripoli, diatomaceous earth, dolomite, etc. as representative ones form the aspect of durability of the magnetic layer of the magnetic recording medium. Particularly, it is desirable to use one to four kinds of abrasive with Mohs' hardness of 6 or more.

The average particle size of the abrasive should be preferably 0.005 to 5 microns, particularly 0.05 to 2 microns. The abrasive should be preferably used in an amount within the range from 0.01 to 20 parts by weight per 100 parts by weight of the ferromagnetic metal powder.

The non-magnetic support in the present invention is not particularly limited, but those conventionally used can be employed. Examples of the material for forming the non-magnetic support may include various synthetic resin films such as of polyethylene terephthalate, polypropylene, polycarbonate, polyethylene naphthalte, polyamide, polyamide imide, polyimide, etc., and metal foils such as aluminum foil, stainless steel foil, etc. Also, the thickness of the non-magnetic support is not particularly limited, but may be generally 2.5 to 10 μm, preferably 3 to 80 μm.

The solvent used during kneading is not particularly limited, but a solvent conventionally used for preparation of a magnetic coating material can be used.

The kneading method is not also particularly limited, and also the order of addition of the respective components can be conveniently set.

For preparation of a magnetic coating material, there can be used conventional kneading machines, such as two-roll mill, three-roll mill, ball mill, pebble mill, throne mill, sand grinder, Szegvari attritor, high speed impeller disperser, high speed stone mill, high speed impact mill, disper, kneader, high speed mixer, homogenizer, etc. The additives are not described strictly under the limitation of having only the effect as described above, but the dispersing agent can also act as tho lubricant or the antistatic agent. Therefore, the effects of the compounds exemplified according to the above classification, etc. are not of course limited to the situation described in the above classification, and when a substance exhibiting a plurality of effects is used, the amount added should be preferably determined in view of the effects of that substance.

Otherwise, cleaning dispersing agents, viscosity index enhancers, flow point dropping agents, antifoam agents, etc. can be also used.

The magnetic coating material thus prepared is coated on the non-magnetic support as described above. Coating can be done directly on the above-mentioned non-magnetic material, but also through an adhesive layer, etc. on the non-magnetic support.

Examples of coating methods onto non-magnetic support may include such methods as air doctor coating, blade coating, rod coating, extrusion coating, air knife coating, squeeze coating, impregnation coating, reverse roll coating, transfer roll coating, gravure coating, kiss coating, cast coating, spray coating and spin coating, etc., and other methods than these can also be utilized.

Thus, the magnetic coating material is coated on the non-magnetic support as described above. At this time, a plural number of magnetic coating materials may be also coated in overlayers successively or simultaneously.

The magnetic layer coated on the non-magnetic support is then applied with the treatment for orienting the ferromagnetic metal powder, followed by drying. Further, after applying, if necessary, the surface smoothening treatment, the product is cut into a desired shape.

On the surface of the non-magnetic support where no magnetic layer is provided, a backing layer which is known per se may also be provided.

In the present invention, there are basic points and acidic points in the ferromagnetic metal powder, and by introducing

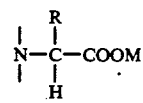

groups into the polyurethane resin, the basic points of N and the acidic points of $-COO^\ominus$ are firmly adsorbed to the acidic points and the basic points of the ferromagnetic metal powder respectively, whereby dispersibility of the ferromagnetic metal powder is extremely improved.

Thus, as contrasted to the one point adsorption in the prior art, namely the acidic group-containing binder of the prior art adsorbed only to the basic point of ferromagnetic metal powder, or the basic group-containing binder only to the acidic point of ferromagnetic metal powder, adsorption is stronger with adsorption at two points in the case of the present invention. Through such firm adsorption to ferromagnetic metal powder, dispersibility becomes better to improve C/N, and also prevention of calender roll contamination or video head clogging is markedly improved. Through such firm adsorption to ferromagnetic powder, durability is enhanced, and also clogging after storage of 3 days at 63° C. is also improved.

The present invention is further described by referring to Examples and Comparative examples. In the respective examples, "parts" indicate "parts by weight".

EXAMPLES AND COMPARATIVE EXAMPLES

On the surface of a polyethylene terephthalate base (non-magnetic support) with a thickness of 10 μm, a coating solution for formation of magnetic layer prepared according to the composition and the method as described below was coated, applied with the magnetic field orientation treatment with a cobalt magnet, and then dried by passing through an atmosphere of 100° C. for one minute to form a magnetic layer with a thickness of 3.0 μm.

Then, the above magnetic layer was applied with the calendering treatment, cut into a tape with a thickness of ½ inch to prepare a VHS type video tape.

PREPARATION OF COATING SOLUTION FOR FORMATION OF MAGNETIC LAYER

Composition

One hundred parts of ferromagnetic metal powder (composition: alloy of Fe 94%, Zn 4%, Ni 2%; Hc 1,500 Oe, crystallite size 250 Å) were pulverized in an open kneader for 10 minutes, then kneaded with 10 parts of a vinyl chloride type copolymer (shown in Table 2) and 60 parts of methyl ethyl ketone for 60 minutes, and subsequently 10 parts of a polyurethane resin (urethane synthesized from the polyol having polar group, the diisocyanate and the crosslinking agent shown in Table 1) and,

| | |
|---|---|
| Abrasive (A1203, made by Sumitomo Chemical Co., Ltd., particle size 3 μm) | 2 parts |
| Carbon black (particle size 40 nm) | 2 parts |
| Methyl ethyl ketone/toluene = 1/1 | 200 parts | were added, followed by dispersion in a sand mill for 120 minutes. To the dispersion were added:

| | |
|---|---|
| Polyisocyanate (Coronate 3041, made by Nippon Polyurethane Co., Ltd.) | 5 parts |
| Stearic acid | 1 part |
| Butyl stearate | 1 part |
| Methy ethyl ketone | 50 parts | and further after stirring and mixing for 20 minutes, the mixture was filtered by use of a filter having an average pore size of 1 μm to prepare a magnetic coating material. The magnetic coating material obtained was coated by use of reverse rolls onto the surface of a polyethylene terephthalate support with a thickness of 10 μm to a thickness after drying of 3.0 μm.

The non-magnetic support coated with the magnetic coating material was subjected to the magnetic field orientation with a magnet of 3,000 Gauss under the undried state of the magnetic coating material, and further after drying, subjected to the super calendering treatment, followed by slitting to a width of 8 mm to prepare a 8 mm video tape.

Calender Roll Contamination

After the calendering treatment, a sample with the magnetic layer peeled off onto the roll surface in contact with the magnetic layer is rated as X, one with slight peel-off adhesion but without practical problem as Δ, one without peel-off adhesion as ∘.

Image Color Signal Noise (Color Noise)

The image signal of the image signal 30IRE overlapped with color sub carrier wave with 100% amplitude was recorded with the standard picture recording current. This was reproduced, passed through a high region filter of 1 kHz and a low region filter of 500 $H_2$, and the color signal noise AM component of the reproduced output signal was measured by a noise measuring instrument. The standard sample was similarly measured and the difference between the standard value obtained and the measured value of the sample is represented in dB.

Video Head Clogging

By use of the video tape recorder as mentioned above, video signals were recorded, and the tape with a 90 minutes length was run for 30 times repeatedly under the environment of 23° C., 30% RH, and the number of sets of runs at which the output was lowered by 3dB or more was examined during that period. A sample with no lowering was rated as ∘, one with lowering for 1 to 3 times as Δ, and one with lowering for 4 times or more as X.

Clogging after Storage at 60° C. for 3 Days

After the video sample was stored under the environment of 60° C., 80% RH for 3 days, the same evaluation as in the above head clogging evaluation was conducted.

TABLE 1

| Polyurethane resin No. | Polymeric polyol $A_1$ | Low molecular weight polyol $A_2$ | Modified amino acid $A_3$ | Organic polyisocyanate | $A_1/A_2/A_3/B$ (Molar ratio) | Weight-average molecular weight (MW) | Tg (°C.) |
|---|---|---|---|---|---|---|---|
| 1 | Polyester diol MW2,000 (from 1,4-butane diol and adipic acid) | 1,4-Butane diol | [HO(CH$_2$CH$_2$O)$_2$CH$_2$CH$_2$]$_2$N—CH$_2$—COOH | TDI | 1/2.4/0.2/35 | 50,000 | 10 |
| 2 | Polyester diol MW2,000 (from 1,4-butane diol and adipic acid) | 1,4-Butane diol | Dimethylolpropionic acid | " | " | " | 10 |
| 3 | Polycaprolactone diol MW2,000 | Neopentyl glycol | [HO(CH$_2$CHO)$_3$CH$_2$CH$_2$]$_2$N (CH$_3$) (CHCH$_3$—COOH) | MDI | 1/5.8/0.3/7 | " | 0 |
| 4 | Polycaprolactone diol MW2,000 | Neopentyl glycol | Dimethylolpropionic acid | " | " | " | 0 |

TABLE 2

| Vinyl chloride resin No. | Vinyl chloride type resin solar group | Weight-average molecular weight |
|---|---|---|
| 1 | —SO$_3$Na = 8 × 10$^{-5}$ eq/g | 50,000 |
| 2 | —OPO(OH)$_2$ = 10 × 10$^{-5}$ eq/g | 50,000 |
| 3 | —COOH = 20 × 10$^{-5}$ eq/g Epoxy group = 20 × 10$^{-5}$ eq/g | 50,000 |
| 4 | —N(CH$_3$)$_2$ = 18 × 10$^{-5}$ eq/g | 50,000 |

TABLE 3

| | Magnetic layer binder | | Measurement item | | | |
|---|---|---|---|---|---|---|
| | Polyurethane resin No. | Vinyl chloride resin No. | Calender roll contamination | Color noise (dB) | Video head clogging | Clogging after storage at 60° C. for 3 days |
| Example 1 | 1 | 1 | ○ | 0.5 | ○ | ○ |
| Comparative example 1 | 2 | 1 | x | 0.0 | x | x |
| Example 2 | 3 | 1 | ○ | 0.5 | ○ | ○ |
| Comparative example 2 | 4 | 1 | x | 0.0 | x | x |
| Example 3 | 1 | 2 | ○ | 0.5 | ○ | ○ |
| Example 4 | 1 | 3 | ○ | 0.0 | ○ | ○ |
| Example 5 | 1 | 4 | Δ | 0.5 | Δ | Δ |
| Example 6 | 3 | 2 | ○ | 0.0 | ○ | ○ |
| Example 7 | 3 | 3 | ○ | 0.5 | ○ | ○ |
| Example 8 | 3 | 4 | Δ | 0.5 | Δ | Δ |

As is apparent from the results in Table 1 to Table 3, the samples of the polyurethane resins No. 1 and No. 3, by use of the modified amino acid ($A_3$), exhibited good effects with respect to calender roll contamination, color noise, video head clogging, and clogging after storage at 63° C. for 3 days. In contrast, the samples of the polyurethane resins No. 2 and No. 4 by use of conventional dimethylolpropionic acid gave rise to peel-off and adhesion of the magnetic layer onto the roll surface in contact with the magnetic layer after the calendering treatment Also, due to insufficient dispersibility, color noise was low and also video head clogging was inferior.

While the invention has been described in detail and with reference to specific embodiments thereof, it will be apparent to one skilled in the art that various changes and modifications can be made therin without departing from the spirit and scope thereof.

What is claimed is:

1. A magnetic recording medium which comprises a non-magnetic support having provided thereon a magnetic layer comprising ferromagnetic metal powder dispersed in a binder, wherein said binder contains a polyurethane resin having an

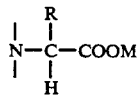

group introduced therein, wherein R represents a hydrogen atom or a straight or branched alkyl group having 1 to 4 carbon atoms and M represents a hydrogen atom, an alkali atom or $NH_4^\oplus$, wherein said polyurethane resin is a polyurethane resin (C) obtained from a polyol (A) comprising a polymeric polyol having a molecular weight of 400 to 4,000 ($A_1$), polyol having a molecular weight of less than 4000 ($A_2$) and a modified amino acid represented by the following formula (I) ($A_3$) and an organic polyisocyanate (B):

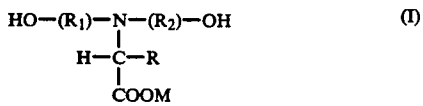

wherein $R_1$ and $R_2$ each represents $-CH_2CH_2-(D-)_m-$, or $-CH_2CH(CH_3)-(D)_n-$, in which m and n each represents an integer of from 2 to 10, and D represents $-OCH_2CH_2-$, $-OCH_2CH(CH_3)-$ or a mixture thereof, and wherein the content of the polyols comprised by ($A_3$) is 0.1 to 30 equivalent %, the content of ($A_2$) is 5 to 90 equivalent %, the content of ($A_1$) is 10 to 90 equivalent %, and the equivalent of (A) is greater than or equal to 100.

2. A magnetic recording medium as in claim 1, wherein the glass transition temperature of said polyurethane resin is from $-40°$ C. to 30° C.

3. A magnetic recording medium as in claim 1, wherein said polyurethane resin has a number-average molecular weight of from 3,000 to 200,000.

4. A magnetic recording medium as in claim 1, wherein said polyurethane resin has a number-average molecular weight of from 5,000 to 150,000.

5. A magnetic recording medium as in claim 1, wherein said binder further contains a vinyl chloride type resin and a polyisocyanate compound.

6. A magnetic recording medium as in claim 5, wherein the vinyl chloride type resin contains (a) at least one polar group selected from the group consisting of $-SO_3M'$, $-SO_4M'$, $-OPO(OM')_2$, $-PO(OM')_2$, $-COOM'$, $-N(R')_3^+$ wherein R' represents a hydrogen atom, an alkali metal or $NH_4^+$ and R' represents a hydrogen atom or a straight or branched alkyl group having 1 to 4 carbon atoms and (b) a hydroxyl group.

7. A magnetic recording medium as in claim 6, wherein the vinyl chloride type resin further contains an epoxy group.

8. A magnetic recording medium as in claim 1, wherein the polymeric polyol ($A_1$) is a polyether diol or a polyester diol.

9. A magnetic recording medium as in claim 1, wherein the content of the polyols comprised by ($A_3$) is 0.1 to 20 equivalent %, the content of ($A_2$) is 10 to 80 equivalent %, and the content of ($A_1$) is 15 to 65 equivalent %.

10. A magnetic recording medium as in claim 1, wherein the equivalent ratio of (B) to (A) is 0.6 to 1.5.

11. A magnetic recording medium as in claim 1, wherein the equivalent ratio of (B) to (A) is 0.8 to 1.2.

12. A magnetic recording medium as in claim 1, wherein the content of said polyurethane resin in the binder is 10 to 50% by weight based on the total binder.

13. A magnetic recording medium as in claim 1, wherein the content of said polyurethane resin in the binder is 20 to 40% by weight based o the total binder.

14. A magnetic recording medium as in claim 5, wherein the weight-average molecular weight of said vinyl chloride type resin is 20,000 to 100,000.

15. A magnetic recording medium as in claim 5, wherein the content of the vinyl chloride type resin is 30 to 60 parts by weight per 100 parts by weight of the total binder.

16. A magnetic recording medium as in claim 5, wherein the content of the polyisocyanate compound is 5 to 40 parts by weight per 100 parts by weight of the total binder.

17. A magnetic recording medium which comprises a non-magnetic support having provided thereon a magnetic layer comprising ferromagnetic metal powder dispersed in a binder, wherein said binder contains a polyurethane resin having an

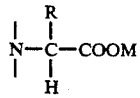

group introduced therein, wherein R represents a hydrogen atom or a straight or branched alkyl group having 1 to 4 carbon atoms and M represents a hydrogen atom, an alkali atom or $NH_4^\oplus$, wherein said polyurethane resin is a polyurethane resin (C) obtained from a polyol (A) comprising a polymeric polyol having a molecular weight of 400 to 4,000 ($A_1$), a low molecular weight polyol ($A_2$) and a modified amino acid represented by the following formula (I) ($A_3$) and an organic polyisocyanate (B):

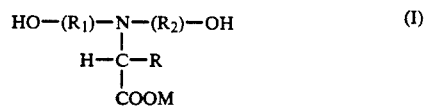

(I)

wherein $R_1$ and $R_2$ each represents $-CH_2CH_2-(D)_m-$, or $-CH_2CH(CH_3)-(D)_n-$, in which m and n each represents an integer of from 2 to 10, and D represents $-OCH_2CH_2-$, $-OCH_2CH(CH_3)-$ or a mixture thereof, and wherein the content of the polyols comprised by ($A_3$) is 0.1 to 30 equivalent %, the content of ($A_2$) is 5 to 90 equivalent %, the content ($A_1$) is 10 to 90 equivalent %, the equivalent of (A) is 100–1,600, the equivalent ratio of (B) to (A) is 0.6–1.5, and the molecular weight of polyurethane resin (C) per one COOH group is equivalent to or greater than 1,000.

* * * * *

UNITED STATES PATENT AND TRADEMARK OFFICE
CERTIFICATE OF CORRECTION

PATENT NO. : 5,165,999

DATED : November 24, 1992

INVENTOR(S) : USHIMARU, ET AL

It is certified that error appears in the above-identified patent and that said Letters Patent is hereby corrected as shown below:

In column 16, line 39, claim 6, delete "R'" and insert --M'--.

Signed and Sealed this

First Day of March, 1994

Attest:

BRUCE LEHMAN

*Attesting Officer*     *Commissioner of Patents and Trademarks*